(12) United States Patent
Mateos

(10) Patent No.: US 7,131,063 B2
(45) Date of Patent: Oct. 31, 2006

(54) METHOD AND SYSTEM FOR DELIVERING DYNAMIC INFORMATION IN A NETWORK

(75) Inventor: Marino Tapiador Mateos, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 09/951,250

(22) Filed: Sep. 13, 2001

(65) Prior Publication Data

US 2003/0050995 A1 Mar. 13, 2003

(51) Int. Cl.
*G06F 15/00* (2006.01)
*G06F 7/00* (2006.01)

(52) U.S. Cl. ............. 715/513; 715/500; 715/522; 707/3

(58) Field of Classification Search ........... 715/513, 715/501.1, 500, 522; 709/206, 227; 707/3, 707/200; 703/7
See application file for complete search history.

(56) References Cited

U.S. PATENT DOCUMENTS

| | | | |
|---|---|---|---|
| 5,657,460 A | 8/1997 | Egan et al. | |
| 5,760,770 A | 6/1998 | Bliss et al. | |
| 5,761,673 A | 6/1998 | Bookman et al. | |
| 5,835,712 A | 11/1998 | DuFresne | |
| 5,860,073 A * | 1/1999 | Ferrel et al. | 715/522 |
| 5,894,554 A | 4/1999 | Lowery et al. | |
| 5,956,487 A | 9/1999 | Venkatraman et al. | |
| 5,966,707 A | 10/1999 | Van Huben et al. | |
| 5,983,227 A * | 11/1999 | Nazem et al. | 707/10 |
| 5,987,480 A * | 11/1999 | Donohue et al. | 715/501.1 |
| 6,026,433 A | 2/2000 | D'Ariach et al. | |
| 6,038,558 A | 3/2000 | Powers et al. | |
| 6,055,565 A | 4/2000 | Inai | |
| 6,219,680 B1 * | 4/2001 | Bernardo et al. | 715/501.1 |
| 6,260,039 B1 * | 7/2001 | Schneck et al. | 707/10 |

(Continued)

FOREIGN PATENT DOCUMENTS

EP    0889421    1/1999

(Continued)

OTHER PUBLICATIONS

JavaScript Examples (hereinafter JS-Examples), http://www.js-examples.com/javascript/?run=375, published Oct. 2000, pp. 1-5.*

*Primary Examiner*—William Bashore
*Assistant Examiner*—Thu V. Huynh
(74) *Attorney, Agent, or Firm*—Duke W. Yee; William H. Steinberg; Wayne P. Bailey

(57) ABSTRACT

A method and system for delivering dynamic web pages, for example including a report resulting from a database query, in the INTERNET. The query is run on a server computer and the resulting records are then transmitted to a client computer as script variables in a header of an HTML document. The body of the HTML document includes tags for displaying the script variables, which define a view template for the records. A browser on the client computer is responsible for interpreting the HTML tags, in order to display the result of the query on the client computer according to the corresponding view template.

16 Claims, 4 Drawing Sheets

U.S. PATENT DOCUMENTS

| | | | |
|---|---|---|---|
| 6,449,636 B1* | 9/2002 | Kredo et al. | 709/206 |
| 6,704,736 B1* | 3/2004 | Rys et al. | 707/100 |
| 6,738,804 B1* | 5/2004 | Lo | 709/219 |
| 2002/0077836 A1* | 6/2002 | Elnozahy et al. | 705/1 |
| 2002/0147746 A1* | 10/2002 | Lee | 707/513 |
| 2003/0009488 A1* | 1/2003 | Hart, III | 707/500 |
| 2003/0009563 A1* | 1/2003 | Douglis et al. | 709/227 |
| 2004/0187080 A1* | 9/2004 | Brooke et al. | 715/522 |
| 2004/0205609 A1* | 10/2004 | Milton et al. | 715/522 |

FOREIGN PATENT DOCUMENTS

| | | |
|---|---|---|
| WO | WO 98/14896 | 4/1998 |
| WO | WO 01/57651 | 8/2001 |

* cited by examiner

METHOD AND SYSTEM FOR DELIVERING DYNAMIC INFORMATION IN A NETWORK

FIELD OF THE INVENTION

The present invention relates to a method and system for delivering dynamic information in a network.

BACKGROUND OF THE INVENTION

Networks of computers are commonly used to implement distributed data processing systems. In particular, the INTERNET has attained a widespread diffusion in the last years. The INTERNET is a network of networks connecting millions of computers with a decentralized design. The INTERNET has a client/server architecture, wherein server computers of the network support shared resources; client computers access the shared resources through the network.

The INTERNET also allows each client computer to interact dynamically with a server computer, in order to download and display information whose content changes each time it is provided by the server computer. This function is typically used for handling generation and distribution of reports resulting from database queries on the server computer.

A solution known in the art for delivering dynamic information in the INTERNET consists in running programs, for example designed to accept and return data conforming to the Common Gateway Interface (CGI), which perform a specific task on the server computer in response to a corresponding request received from the client computer. For example, the CGI program executes a query on a database of the server computer; each record resulting from the query is stored into a corresponding variable of the CGI program. A report is built on the server computer reading these variables and performing the appropriate manipulations. The report is then sent to the client computer ready to be displayed.

A drawback of the solution described above is that a data model employed by the data base of the server computer usually does not match with all the reports that can be generated by the server computer, so that a direct data access is not possible. In other words, the CGI program building the report cannot query a single table of the data base directly. Conversely, the CGI program must query different data base tables, in order to build a single row to be shown in a table of the report. This implies a dynamic memory allocation process to store the corresponding variables of the CGI program, since the number of records resulting from the queries is not known a priori. As a consequence, execution of the CGI program is prone to generate errors due to missing allocation of memory on the server computer.

Moreover, the CGI program running the query and building the report is quite complex. Therefore, execution of this program severely affects the performance of the server computer. This drawback is particularly acute in a high-availability server computer, to which a large number of requests for complex reports are submitted at the same time. In this case, the heavy exploitation of resources on the server computer increases its response time, thereby slowing down operation of the whole network.

SUMMARY OF THE INVENTION

It is an object of the present invention to improve the server computer reliability.

It is another object of the present invention to reduce the amount of memory to be allocated and managed on the server computer.

It is yet another object of the present invention to avoid any dynamic memory allocation process on the server computer.

Moreover, it is an object of the present invention to improve the performance of the network.

It is another object of the present invention to reduce the response time of the server computer.

It is yet another object of the present invention to simplify the process executed on the server computer in response to each request submitted by the client computer.

The accomplishment of these and other related objects is achieved by a method of delivering dynamic information in a network including the steps of: requesting, by a client computer, the dynamic information from a server computer of the network, retrieving the dynamic information under the control of the server computer, retrieving a view template for the dynamic information under the control of the server computer, transmitting the dynamic information and the view template from the server computer to the client computer, and combining the dynamic information with the view template under the control of the client computer for displaying the dynamic information on the client computer according to the view template.

The present invention also provides a computer program application for performing the method and a product storing the application. Furthermore, the present invention provides a corresponding system for delivering dynamic information in a network.

Moreover, the present invention provides a computer program directly loadable into a working memory of a server computer of a network for performing a method of delivering dynamic information in the network when the program is run on the server computer. The method includes the steps of: receiving a request for the dynamic information from a client computer of the network, retrieving the dynamic information, retrieving a view template for the dynamic information, transmitting the dynamic information and the view template to the client computer for causing the client computer to combine the dynamic information with the view template for displaying the dynamic information on the client computer according to the view template.

Finally, the present invention provides a product storing the program.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1:
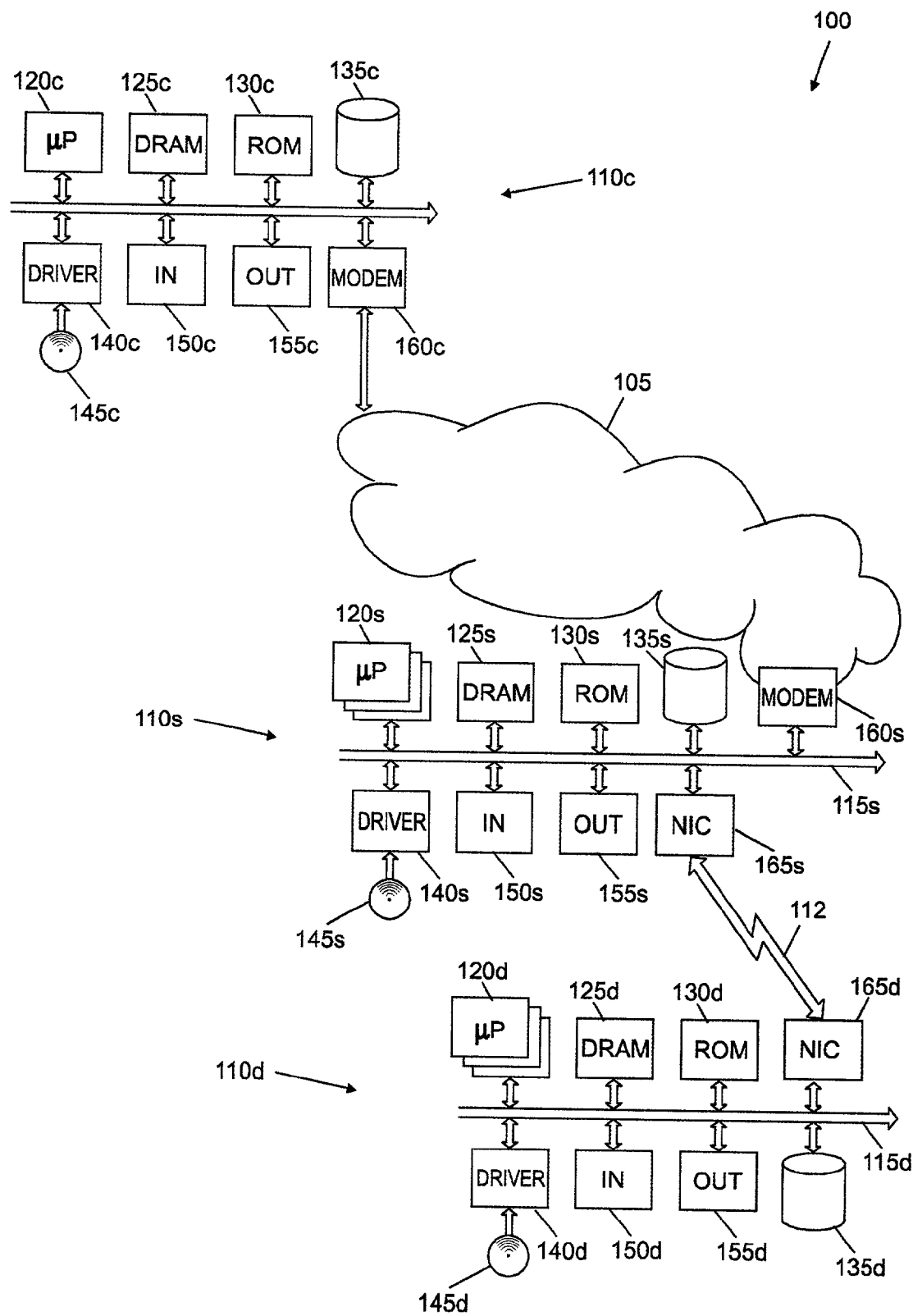
FIG. 1 is a schematic representation of a data processing system in which the method of the invention can be used.

With reference in particular to FIG. 1, there is shown a data processing system 100. The system 100 includes a network 105, which may be in particular the INTERNET. The INTERNET 105 is formed by millions of computers, which are connected to each other through a telecommunication structure. Client computers 110c access the INTERNET 105 through an Internet Service Provider, or ISP (not shown in the figure); access to the INTERNET 105 allows users of the client computers 110c to exchange information, send and receive e-mails, and view documents. Particularly, a system of server computers 110s (the World Wide Web) manages hypertext documents, known as web pages. Each web page is formatted in HTML, a language that supports links to other documents, as well as to graphics, audio, and video files. The web uses the HTTP protocol, which defines how messages are formatted and transmitted, and what actions the client computers 110c and the server computers 110s should take in response to various commands. A generic server computer 110s of the INTERNET 105 is coupled to a corresponding development computer 110d through a Local Area Network (LAN) 112.

Each client computer 110c, typically consisting of a Personal Computer (PC), is formed by several units which are connected in parallel to a communication bus 115c. In detail, a microprocessor (μP) 120c controls operation of the client computer 110c, a working memory 125c, typically a DRAM (Dynamic Random Access Memory) is directly used by the microprocessor 120c, and a Read Only Memory (ROM) 130c stores a basic program for the bootstrap of the client computer 110c. Several peripheral units are further connected to the bus 115c (by means of respective interfaces). Particularly, a bulk memory consists of a magnetic hard-disk 135c and a driver 140c for reading CD-ROMs 145c. Moreover, the client computer 110c includes an input unit (IN) 150c (for example consisting of a keyboard and a mouse), and an output unit (OUT) 155c (for example consisting of a monitor and a printer). A MODEM 160c is used to connect the client computer 110c to the INTERNET 105.

Each server computer 110s (for example consisting of a mini-computer) is likewise formed by a bus 115s, multiple microprocessors 120s, a DRAM 125s, and a ROM 130s; the server computer 110s further includes a hard-disk 135s, a driver 140s for CD-ROMs 145s, an input unit 150s and an output unit 155c. A MODEM 160s couples the server computer 110s to the INTERNET 105, while a Network Interface Card (NIC) 165s is used to plug the server computer 110s into the LAN 112. An analogous structure is employed for the development computer 110d. Particularly, the development computer 110d includes a bus 115d, multiple microprocessors 120d, a DRAM 125d, a ROM 130d, a hard-disk 135d, a driver 140d for CD-ROMs 145d, an input unit 150d, an output unit 155d, and a NIC 165d.

Similar considerations apply if a different network is envisaged (such as an INTRANET), if each client computer, server computer and development computer has a different structure (for example with the PCs replaced by network computers or web TV systems), if the computers include different units (such as scanners or web cams), if the server computer is coupled to the development computer in a different manner (for example through a point-to-point connection), if the server computer and the development computer consist of distinct logic partitions of a single system, and so on.

Figure 2:
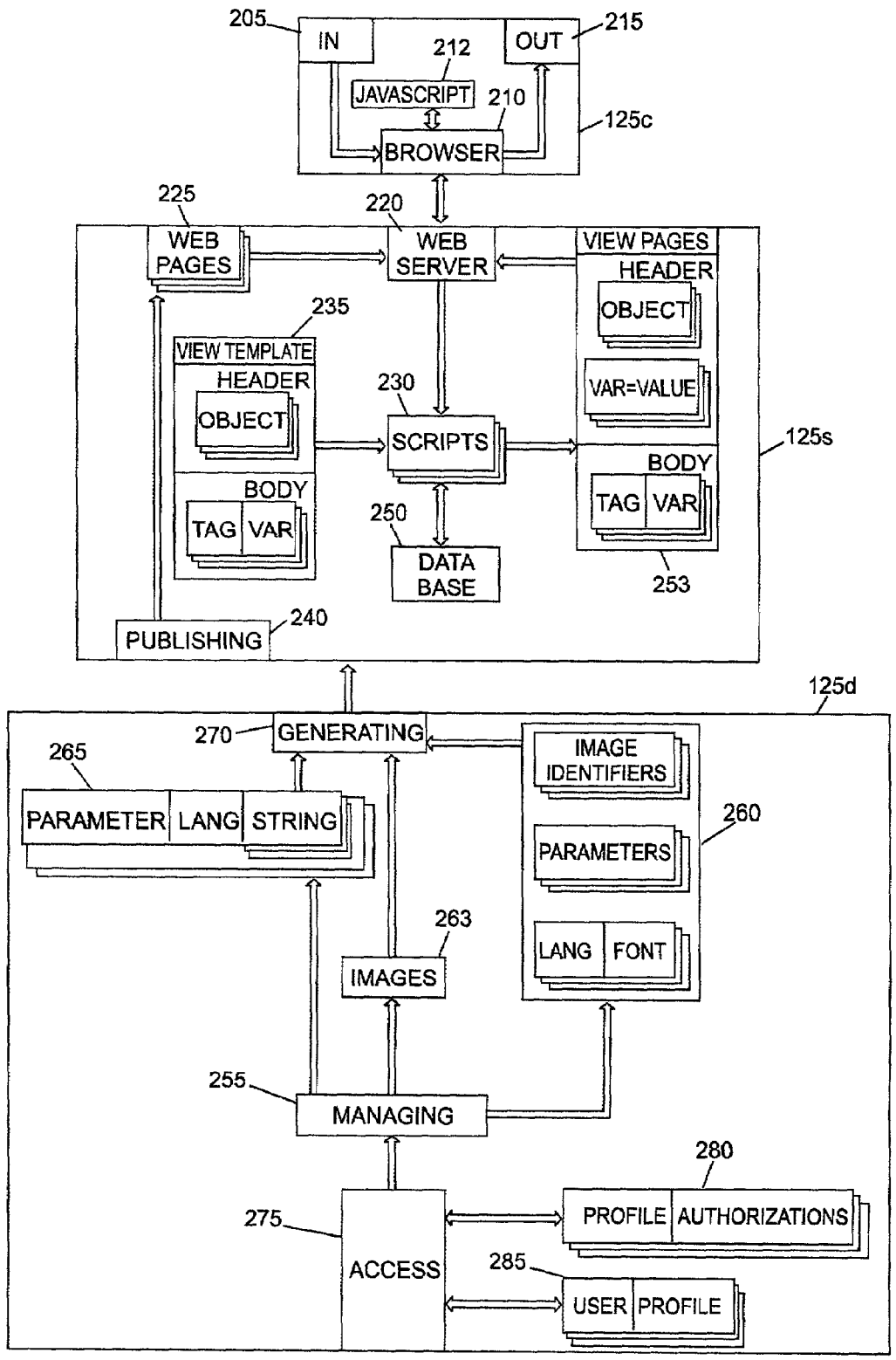
FIG. 2 depicts a partial content of a working memory of a client computer, a server computer and a development computer of the system.

Considering now FIG. 2, there is shown a partial content of the working memories 125c, 125s and 125d of the client computer, the server computer and the development computer, respectively; the information (programs and data) is typically stored on the respective hard-disks and loaded (at least partially) into the working memories when the programs are running, together with an operating system and other application programs (not shown in the figure). The programs are initially installed onto the hard disks from CD-ROMs.

Considering in particular the client computer, an input interface (IN) 205 is resident in its working memory 125c; the input interface 205 is used to enter data and/or commands (with the keyboard and the mouse) by the user of the client computer. The input interface 205 is coupled to a browser 210, which allows the user to surf through the INTERNET, in order to locate and display web pages. A plug-in module 212 enables the browser 210 to interpret instructions written in the JavaScript language. The browser 210 directly interfaces with an output buffer (OUT) 215 for the monitor of the client computer.

The working memory 125s of the server computer includes a web server module 220, which executes commands submitted by each client computer and delivers corresponding web pages. The web server module 220 accesses a repository of static web pages 225; each web page consists of an HTML document that is fetched by the web server module 220 on request. The web server further controls execution of scripts 230, each one consisting of a CGI program. The CGI program 230 accesses a repository of view templates 235 for dynamic web pages. Each view template 235 consists of an HTML document with a header and a body. The header includes a script with instructions declaring a series of script objects; the body includes a series of markup tags for displaying script variables associated with different instances of the script objects. A publishing module 240 controls updating of the web pages 225 and of the view templates 235.

The CGI program 230 runs queries on a database 250, in order to retrieve dynamic information requested by the user of the client computer. An output buffer is used for providing web pages 253 built by the CGI program 230 to the web server module 220. Each web page 253 is obtained from the corresponding view template 235 by inserting a series of statements into its header; each statement assigns the value of a record (or field) extracted from the database to a corresponding script variable.

The following code provides a simple example of a web page built from the corresponding view template as described above:

```
<html>
<head><title>Data-View Test</title></head>
<body>
<!-- ***************** Data Section **************** -->
<SCRIPT language="JavaScript">
//Constructor:
function TableObj(msg1,msg2) {
    // Initialization.
    this.msg1 = msg1;
    this.msg2 = msg2;
}
var TableVar = new TableObj("Text1","Text2");
</SCRIPT>
<!-- ***************** View Section **************** -->
Table View:
<table border=1>
```

-continued

```
<tr><td>Row1</td>
<td><script>document .write(Table1.msg1);</script></td></tr>
<tr><td>Row2</td>
<td><script>document.write(Table1.msg2);</script></td></tr>
</table>
</body>
</html>
```

The HTML document starts with the <html> tag and ends with the </html> tag. The definition of what the web page is about (Data-View Test) is put between the <head> and </head> tags. All the information to be included in the web page fits in between the <body> and </body> tags.

The HTML document has a data section, which starts with a tag identifying a script written in the JavaScript language. The script includes the definition of an object TableObj consisting of a table with two rows. A variable TableVar for this object is then declared, and the dynamic information resulting from a query on the database is assigned to this variable. In the example at issue, the result of the query consists of the words "Text1" and "Text2", which are assigned to the first and second rows of the variable TableVar, respectively. The script ends with the </SCRIPT> tag.

The HTML document further includes a view section (starting with a corresponding line of comment). A table is defined between the <table border=1> and </table> tags. A new row of the table begins with the <tr> tag. The <td> and </td> tags denote the piece of information to be put in each cell of the row. In the example at issue, the first row of the table includes the word "Row1" and the result of the document.write JavaScript command, that is the word "Text1". The definition of the row ends with the </tr> tag. In a similar manner, the second row of the table consists of the words "Row2" and "Text2".

When the HTML document is sent to the client computer, the browser interprets the HTML tags. As a consequence, a table with the dynamic information retrieved from the database of the server computer is displayed on the client computer.

The display of the web page on the client computer is then split into two distinct and consecutive steps. In a first step, the dynamic information is retrieved from the database and passed to the client computer as script variables. In a second step, the instructions referring to the script variables are sent to the client computer; the browser is responsible for executing these instructions, in order to display the dynamic information on the client computer.

In other words, the process of delivering dynamic information in the network is handled by three nearly independent components (each one specialised for its task), according to the Model-View-Controller paradigm. Particularly, the script implements the Model that holds the dynamic information being manipulated. The template implements the View, which manages the graphical and/or textual display of the dynamic information to the user. The browser implements the Controller, which responds to all user actions and notifies the Model and the View appropriately.

Considering now the development computer, a managing tool 255 is resident in its working memory 125d; the tool 255 is used to edit, view, retrieve, input and perform other management functions on a structural model data base 260, an image data base 263, and a text data base 265. Each structural model 260 defines the layout of a corresponding static web page 225 or view template 235. The structural model 260 includes references to the images 263 (denoted with corresponding image identifiers); for example, the images define background pictures for navigation buttons or page title banners. Static parameters are used to associate a string to each image. The structural model 260 further includes a field defining the language of the strings (LANG), and a field defining the font of their characters (FONT). The text database 265 includes a record for each parameter; the record consists of the string associated with the parameter, which is translated into a series of different languages.

A generating module 270 accesses the data bases 260, 263 and 265; the generating module 270 builds new web pages 225 and view templates 235, which are sent to the publishing module 240 of the server computer. Each web page 225 or view template 235 is obtained from the respective structural model 260 by inserting the associated images and strings; the strings are added in the chosen language, with the characters in the selected font.

An access module 275 controls different privileges to use the managing tool 255, which are granted to specific users or groups of users of the development computer. For this purpose, an inventory 280 stores different profiles each one defined by the respective authorizations, and an inventory 285 associates each user (or group of users) with a corresponding authorization profile. For example, a web administrator is authorized to generate and publish new web pages and view templates, web developers are authorized to access the structural model data base 260, graphic designers are authorized to access the image data base 263, whereas translators are authorized to access the text data base 265.

Similar considerations apply if the whole application (programs on the client computer, the server computer and the development computer) and the corresponding data are structured in a different manner, if different modules or functions are provided, if the data base is stored elsewhere, if the scripts on the server computer conform to a different standard, such as the Server-Side Includes (SSI), if the web pages are defined in a different manner (for example using equivalent markup tags and with a script written in a different language). Alternatively, each structural model includes equivalent static parameters, the fields LANG and FONT are associated with the structural models in a different manner (for example they are stored in a further data base), the field LANG is replaced by an equivalent version identifier (for example defining different regional information), the field FONT is replaced by an equivalent style identifier (for example defining the colour of the characters), and so on.

Figure 3:
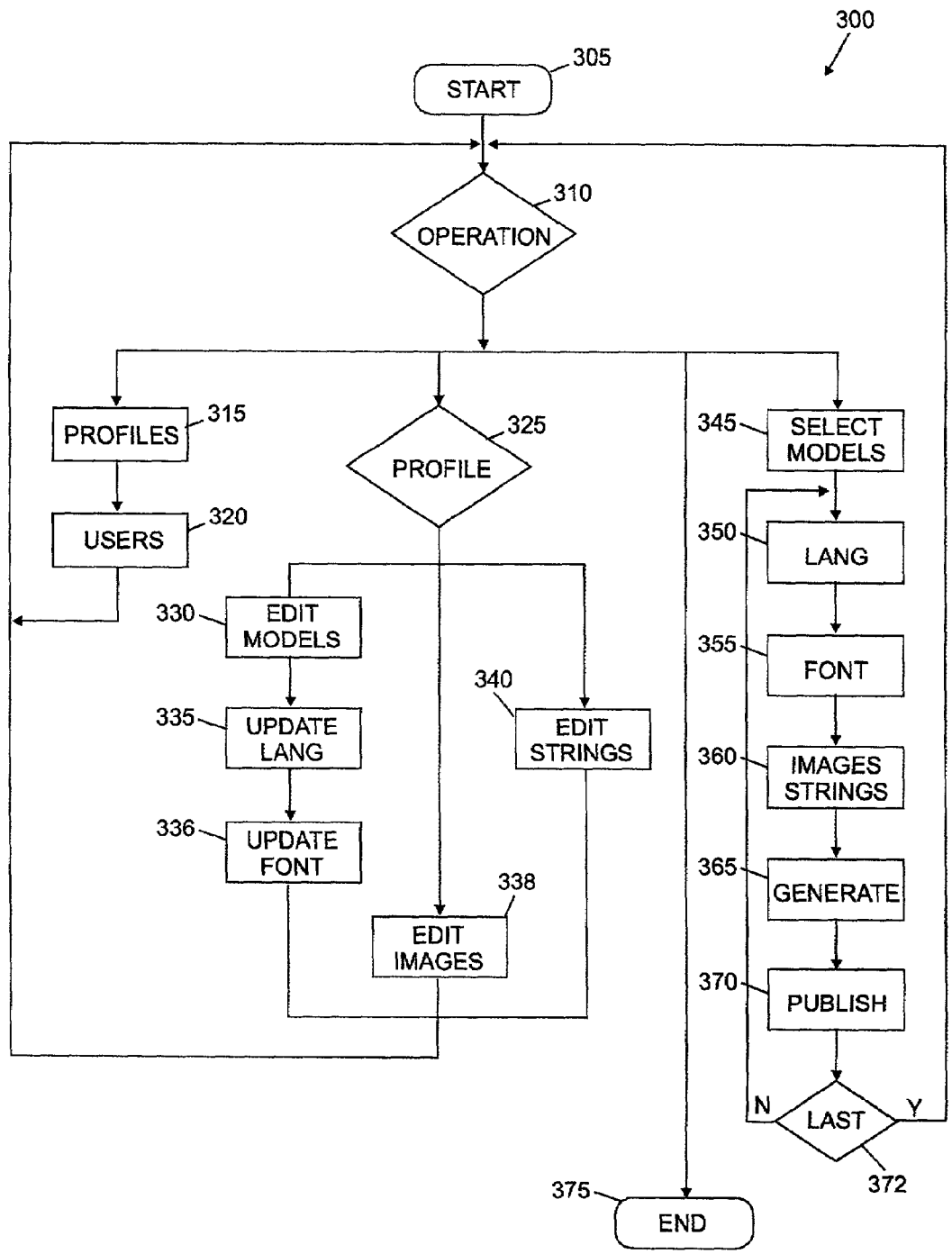
FIG. 3 shows a flow chart describing the logic of a method used for generating static web pages and view templates off-line.

With reference to FIG. 3, operation of the development computer involves execution of a method 300 that starts at block 305. A menu with a series of possible choices is displayed on the monitor of the development computer at block 310; the method then carries out the operations corresponding to the selected choice. Particularly, if the user has selected an administration function the blocks 315–320 are executed, if the user has selected an editing function the blocks 325–340 are executed, whereas if the user has selected a publishing function the blocks 345–372 are executed; conversely, if the user has selected an exit option, the method ends at the final block 375.

Considering now block 315 (administration function), a system administrator may insert, update or delete the authorization profiles. Continuing to block 320, the system administrator may change the authorization profile associated with each user (or group of users). The method then returns to block 310 waiting for a new command.

With reference to block 325 (editing function), the method checks the authorization profile associated with the current user. If the user has started a section (on the development computer) as web developer, the method passes to block 330. The user may then insert new structural models or may delete the old ones; moreover, the user may update existing structural models, for example changing their layout or content (images and strings). For each structural model, the user may then update the field LANG (defining the language of the strings) at block 335, and he/she may update the field FONT (defining the font of the characters) at block 336. If the user has started the section as graphic designer (block 325), the method continues to block 338; in this case, the user is allowed to update each image used by the structural models. If the user has started the section as translator (block 325) the method descends into block 340, wherein the user may convert the strings of the text database into different languages. In any case, the method then returns to block 310 waiting for a new command.

Considering now block 345 (publishing function), a web administrator selects the structural models to be deployed. The method identifies the language selected for the strings of a first structural model at block 350 (according to the field LANG); the method likewise identifies the font selected for the characters of the structural model at block 355 (according to the field FONT). Passing to block 360, the images defined in the structural model and the strings associated with the corresponding parameters (in the selected language) are retrieved from the respective databases. The web page is then generated off-line at block 365, by replacing the image identifiers with the corresponding images and the parameters with the corresponding strings (in the selected font). The resulting web page is sent to the server computer at block 370, in order to be published and put into production. The method checks at block 372 if a last structural model has been processed. If not, the method returns to block 350 for repeating the operations described above on a next structural model; on the contrary, the method returns to block 310 waiting for a new command.

Figure 4:
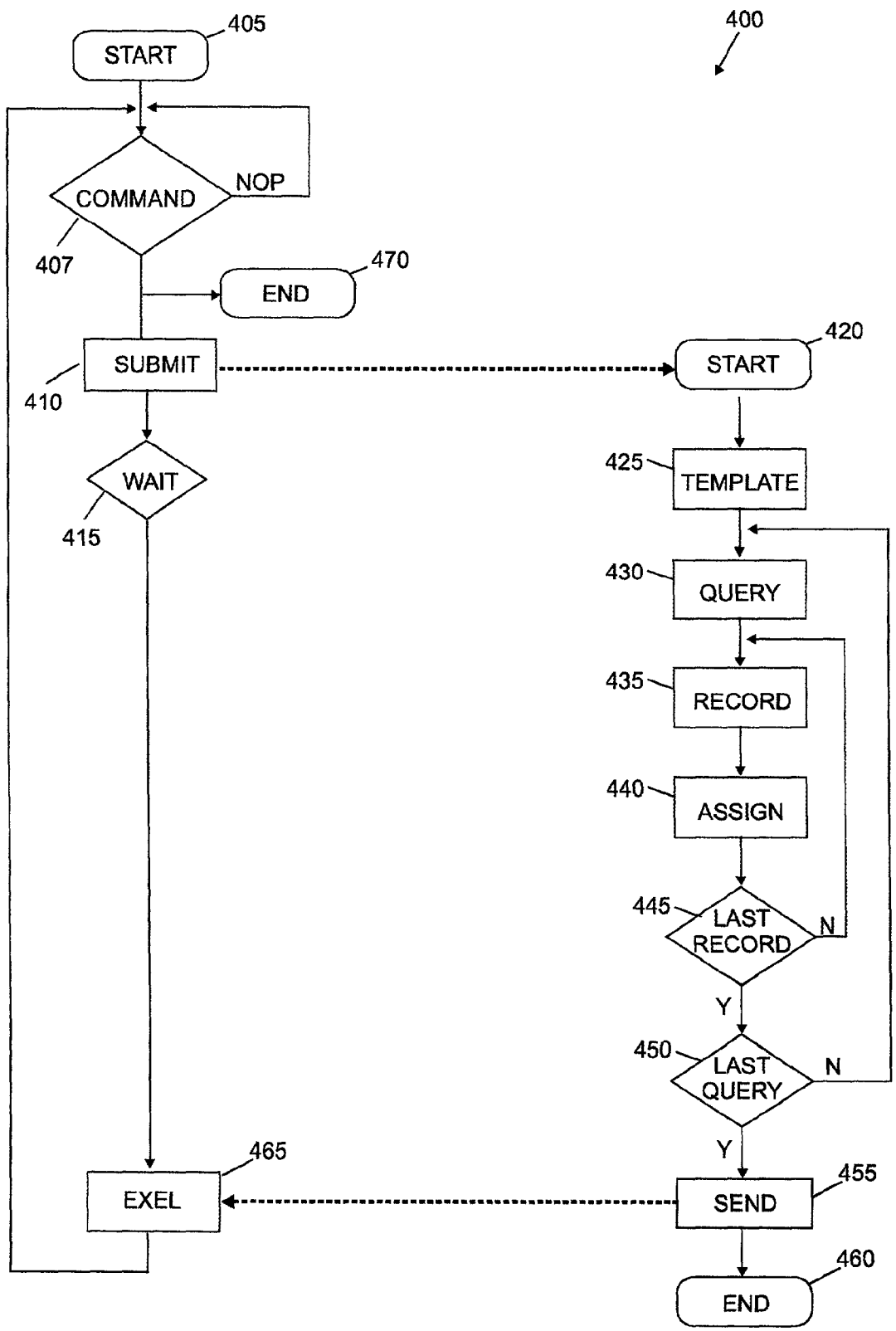
FIG. 4 shows a flow chart describing the logic of a method used for delivering dynamic information.

Moving to FIG. 4, whenever the user of the client computer wishes to receive dynamic information from the server computer (such as a report resulting from a database query), a non-sequential process making up a method 400 is performed on the client and server computers. The browser starts its execution at block 405, and then enters an idle loop at block 407 waiting for an action by the user. If the user has entered a command the blocks 410,415,465 are executed; conversely, if the user has chosen to close the browser its execution ends at the final block 470.

Considering in particular block 410, the user inputs a filter for the dynamic information and submits the corresponding request to the server computer by selecting a respective hot spot of a web page currently displayed on the client computer. The associated command received by the web server module causes the CGI program (denoted as associated action in the command) to start its execution. The browser then enters an idle loop at block 415, waiting for the requested web page from the server computer.

At the same time, the CGI program starts at block 420. Continuing to block 425, the CGI program retrieves the view template associated therewith. The method then proceeds to block 430, wherein the CGI program runs a first query on the database according to the filter provided by the user and passed to the CGI program as a parameter. A first record fetched from the database is assigned to a buffer variable of the CGI program at block 435. The method descends into block 440, wherein a statement assigning the content of the buffer variable of the CGI program to a first script variable is inserted into the header of the view template. The CGI program checks at block 445 whether a last record of the query has been fetched from the database. If not, the method returns to block 435 for inserting a further statement into the view template (assigning a next record of the query to the same buffer variable). Conversely, the method checks at block 450 whether a last query has been run. If not, the method returns to block 430 for executing a next query on the database. On the contrary, the resulting web page is inserted into the output buffer at block 455; the CGI program then ends its execution at block 460, in order to cause this web page to be sent to the client computer.

The browser resumes its operation in response to the web page received from the server computer at block 465. The browser interprets the HTML tags contained in the received document. As a consequence, the web page is displayed on the monitor of the client computer according to the instructions stored in its view section and using the dynamic information stored in the script variables of its data section. The method then returns to block 407 waiting for a new command.

Similar considerations apply if the programs perform equivalent methods, for example with error routines or escape functions, if different information is requested dynamically from the client computer to the server computer (for example a whether forecast), if the dynamic information and the view template are retrieved in a different manner, and the like.

More generally, the present invention provides a method of delivering dynamic information in a network. The method starts with the step of a client computer requesting the dynamic information from a server computer of the network. The dynamic information and a view template for the dynamic information are retrieved under the control of the server computer. The dynamic information and the view template are then transmitted from the server computer to the client computer. The dynamic information is combined with the view template under the control of the client computer, in order to display the dynamic information on the client computer according to the view template.

The solution of the invention removes the need to have the entire dynamic information available on the server computer, since the distribution of the information in the web page is carried out later on by the client computer. Therefore, each record resulting from the query on the database may be fetched and transmitted directly. This reduces the amount of memory to be allocated and managed on the server computer, and avoids any dynamic memory allocation process. As a consequence, the server computer reliability is greatly improved.

The devised solution simplifies the process executed on the server computer in response to each request submitted by the client computer. In fact, the CGI program running on the server computer simply retrieves the records from the data base and inserts statements into the view template assigning the records to corresponding script variables (without performing any manipulation). Moreover, the records may be fetched from the database sequentially, irrespective of their order of displaying in the respective web page. This reduces the response time of the server computer. Most of the operations required for actually displaying the dynamic information are then distributed among a large number of client computers, which usually have plenty of resources that are not exploited. As a consequence, the performance of the network as a whole is greatly improved. This solution is particularly advantageous for high-availability server computers, even if different applications are contemplated.

The preferred embodiment of the invention described above offers further advantages. For example, the records are sequentially fetched and a corresponding statement assigning the current record to a corresponding variable is inserted into a first section of the view template; a second section of the view template includes instructions for displaying the variables, which are executed on the client computer.

This structure is quite versatile. Moreover, combination of the dynamic information with the corresponding view template simply requires the execution of the instructions for displaying the variables to which the records resulting from the query have been assigned.

Preferably, the view template with the inserted statements defines a web page; the instructions are markup tags and the statements are script code.

In this way, the different sections of the view template (providing the dynamic information and the corresponding instructions) interact between them directly. Moreover, standard browsers generally support the language used to write the script, so that no change is required on the client computer to implement the proposed solution.

Alternatively, the view template and the resulting web page have a different structure (for example the dynamic information is stored in a separate file), the method is implemented in a network that employs different structures to be displayed on the client computers, the dynamic information and the corresponding instructions are transmitted to the client computer independently, the dynamic information and the view template are combined in a different manner on the client computer, and so on.

In an advantageous embodiment of the present invention, each structure to be displayed on the client computers (such as the static web pages and the view templates) is off-line generated from a corresponding structural model including static parameters.

This feature makes the process of building new web pages very efficient. Particularly, different components of the web page, such as images and strings, may be independently classified and modelled. Moreover, the devised feature provides a quick way to automatically perform changes in large sets of web pages. This process is carried out off-line (without any manipulation on the server computer), so that the performance of the network is not impaired.

Preferably, each structural model includes a version identifier that defines the current set of values to be assigned to the static parameters (for example the language of the strings). In this way, any change of version may be put into effect in a very simple and fast manner on a large number of web pages at the same time.

Moreover, the structural model further includes a style identifier, which defines the appearance of the web page (for example the font of the characters). Even in this case, any change of style of the web pages is very simple and fast.

Advantageously, access to the above-described elements is controlled according to different authorization profiles.

The proposed feature makes it possible to implement a management by roles of the web pages. For example, the graphic designer generates the images, without knowing any foreign language; the changes to the strings put on top of the images are effected by the translator in an independent way.

Alternatively, no different privileges to access the development computer are provided, neither font identifier nor version identifier are included in the structural models, or the web pages are generated in a standard manner. Vice-versa, these additional features are suitable to be used (alone or combined with each other) for generating any kind of structure to be displayed on the client computers, even without the method of delivering dynamic information described above.

Advantageously, the solution according to the present invention is implemented with a computer program application, which may be provided on CD-ROMs.

Alternatively, the programs may be distributed on floppy-disks, pre-loaded onto the hard-disks, or stored on any other computer readable medium, sent to the computers through the INTERNET, broadcast, or more generally are provided in any other form loadable into the working memories of the computers. However, the method according to the present invention leads itself to be carried out even with a hardware structure, for example integrated in a chip of semiconductor material.

Moreover, it should be noted that the program on the server computer is suitable to be implemented and put on the market as a stand-alone product (independently of the other programs), in order to be used with existing browsers.

Naturally, in order to satisfy local and specific requirements, a person skilled in the art, once taught the present invention, may apply to the solution described above many modifications and alterations all of which, however, are included within the scope of protection of the invention as defined by the following claims.

What is claimed is:

1. A method of delivering dynamic information in a network comprising:

receiving a request generated by a client computer for the dynamic information from a server computer of the network, wherein the request includes a user input of a filter for dynamic information;

responsive to receiving the request, executing a program at the server computer to generate queries on a database according to the filter inputted by the user to retrieve the dynamic information;

responsive to receiving the requesting, executing the program at the server to retrieve a view template for the dynamic information, wherein the view template is a document with a first section and a second section in which the first section includes a script with instructions declaring a series of script objects and in which the second section includes a series of markup tags for displaying script variables associated with different instances of the script objects;

placing the dynamic information into the view template to form the script variables, wherein the dynamic information retrieved from the database is assigned to the script variables by the server computer without page formatting of the dynamic information by the server computer;

transmitting the view template containing the dynamic information as script variables from the server computer to the client computer; and processing, by the client computer, the script variables using the script within the view template under control of the client computer for displaying the dynamic information on the client computer according to the view template.

2. The method according to claim 1, wherein the dynamic information includes a plurality of records for the script variables; wherein the step of executing the program at the server to generate queries includes sequentially fetching each record and inserting a statement assigning the record to a corresponding variable in a second section of the view template; and wherein the step of processing, by the client, the script variables within the view template includes executing the script.

3. The method according to claim 2, wherein the view template with the inserted statements defines a web page, the instructions include markup tags, and the statements include script code.

4. The method of claim 2, wherein the view template is a hypertext markup language document for a web page.

5. The method according to claim 1, further comprising:
providing a plurality of structural models, each one for a corresponding structure to be displayed on the client computer, each structural model including a plurality of static parameters,
providing a current set of values for the static parameters of each structural model,
off-line generating each structure from the corresponding structural model by replacing the static parameters with the current set of values, and
making available the generated structures on the server computer.

6. The method according to claim 5, further comprising:
storing a plurality of different sets of values for the static parameters of each structural model, each set of values being defined by a corresponding version identifier,
associating the version identifier of the current set of values with each structural model, and
retrieving the current set of values for the static parameters of each structural model according to the associated version identifier.

7. The method according to claim 6, further comprising:
storing a plurality of authorization profiles for a development system of the structures,
starting a section on the development system with a selected authorization profile, and
accessing the structural models or the sets of values for the static parameters according to the selected authorization profile.

8. The method according to claim 5, further comprising:
associating a style identifier with each structural model, the style identifier defining a displaying style of the corresponding structure, and wherein the step of off-line generating each structure includes inserting the current set of values in the displaying style defined by the style identifier.

9. A computer program application in a computer readable medium for performing a method of delivering dynamic information in a network when the application is run on a data processing system, the computer program application comprising:
first instructions for receiving a request generated by a client computer for the dynamic information from a server computer of the network, wherein the request includes a user input of a filter for dynamic information;
second instructions, responsive to receiving the request, for executing a program at the server computer to generate queries on a database according to the filter inputted by the user to retrieve the dynamic information;
third instructions, responsive to receiving the requesting, for executing the program at the server to retrieve a view template for the dynamic information, wherein the view template is a document with a first section and a second section in which the first section includes a script with instructions declaring a series of script objects and in which the second section includes a series of markup tags for displaying script variables associated with different instances of the script objects;
fourth instructions for placing the dynamic information into the view template to form the script variables, wherein the dynamic information retrieved from the database is assigned to the script variables by the server computer without page formatting of the dynamic information by the server computer;
fifth instructions for transmitting the view template containing the dynamic information as script variables from the server computer to the client computer; and
sixth instructions for processing, by the client computer, the script variables using the script within the view template under control of the client computer for displaying the dynamic information on the client computer according to the view template.

10. The computer program application according to claim 9, further comprising:
seventh instructions for providing a plurality of structural models, each one for a corresponding structure to be displayed on the client computer, each structural model including a plurality of static parameters,
eighth instructions for providing a current set of values for the static parameters of each structural model,
ninth instructions for off-line generating each structure from the corresponding structural model by replacing the static parameters with the current set of values, and
tenth instructions for making available the generated structures on the server computer.

11. The method according to claim 10, further comprising:
eleventh instructions for storing a plurality of different sets of values for the static parameters of each structural model, each set of values being defined by a corresponding version identifier,
twelfth instructions for associating the version identifier of the current set of values with each structural model, and
thirteenth instructions for retrieving the current set of values for the static parameters of each structural model according to the associated version identifier.

12. The method according to claim 11, further comprising:
tenth instructions for storing a plurality of authorization profiles for a development system of the structures,
eleventh instructions for starting a section on the development system with a selected authorization profile, and
twelfth instructions for accessing the structural models or the sets of values for the static parameters according to the selected authorization profile.

13. The method according to claim 10, further comprising:
eleventh instructions for associating a style identifier with each structural model, the style identifier defining a displaying style of the corresponding structure, and wherein the step of off-line generating each structure includes inserting the current set of values in the displaying style defined by the style identifier.

14. A computer program in a computer readable medium for performing a method of delivering dynamic information in a network when the computer program is run on a server computer, the computer program product comprising:
first instructions for receiving a request for the dynamic information from a client computer of the network, wherein the request includes a user input of a filter for dynamic information;

second instructions, responsive to receiving the request, for generating queries to a data base to retrieve the dynamic information, third instructions for retrieving a view template for the dynamic information, wherein the view template is a document with a first section and a second section in which the first section includes a script with instructions declaring a series of script objects and in which the second section includes a series of markup tags for displaying script variables associated with different instances of the script objects;

fourth instructions for placing the dynamic information into the template as of script variables, wherein the dynamic information retrieved from the database is assigned to the script variables by the server computer without page formatting of the dynamic information by the server computer; and fifth instructions for transmitting the view template, containing the dynamic information, to the client computer for causing the client computer to combine the dynamic information with the view template for displaying the dynamic information on the client computer according to the view template.

15. A system for delivering dynamic information in a network, the system comprising:

a client computer;

a server computer; and wherein the client computer includes means for receiving a request generated for the dynamic information from the server computer, and wherein the server computer includes means responsive to receiving the request, for executing a program at the server computer to generate queries on a database according to the filter inputted by the user to retrieve the dynamic information; means responsive to receiving the requesting, for executing the program at the server to retrieve a view template for the dynamic information, wherein the view template is a document with a first section and second section in which the first section includes a script with instructions declaring a series of script objects and in which the second section includes a series of markup tags for displaying script variables associated with different instances of the script objects; means for placing the dynamic information into the view template to form the script variables, wherein the dynamic information retrieved from the database is assigned to the script variables by the server computer without page formatting of the dynamic information by the server computer; means for transmitting the view template containing the dynamic information as script variables from the server computer to the client computer; and means for processing, by the client computer, the script variables using the script within the view template to display the dynamic information on the client computer according to the view template.

16. A system for delivering dynamic information in a network, the system comprising:

a client computer;

a server computer; and wherein the client computer includes a software module for receiving a request generated for the dynamic information from the server computer, and wherein the server computer includes a first software module responsive to receiving the request, for executing a program at the server computer to generate queries on a database according to the filter inputted by the user to retrieve the dynamic information; a second software module responsive to receiving the requesting, for executing the program at the server to retrieve a view template for the dynamic information, wherein the view template is a document with a first section and second section in which the first section includes a script with instructions declaring a series of script objects and in which the second section includes a series of markup tags for displaying script variables associated with different instances of the script objects; a third software module for placing the dynamic information into the view template to form the script variables, wherein the dynamic information retrieved from the database is assigned to the script variables by the server computer without page formatting of the dynamic information by the server computer; a fourth software module for transmitting the view template containing the dynamic information as script variables from the server computer to the client computer; and a fifth software module for processing, by the client computer, the script variables using the script within the view template to display the dynamic information on the client computer according to the view template.

* * * * *